US011816889B2

(12) United States Patent
Gan et al.

(10) Patent No.: US 11,816,889 B2
(45) Date of Patent: Nov. 14, 2023

(54) UNSUPERVISED VIDEO REPRESENTATION LEARNING

(71) Applicant: International Business Machines Corporation, Armonk, NY (US)

(72) Inventors: Chuang Gan, Cambridge, MA (US); Dakuo Wang, Cambridge, MA (US); Antonio Jose Jimeno Yepes, Melbourne (AU); Bo Wu, Cambridge, MA (US)

(73) Assignee: International Business Machines Corporation, Armonk, NY (US)

(*) Notice: Subject to any disclaimer, the term of this patent is extended or adjusted under 35 U.S.C. 154(b) by 205 days.

(21) Appl. No.: 17/216,605

(22) Filed: Mar. 29, 2021

(65) Prior Publication Data

US 2022/0309278 A1  Sep. 29, 2022

(51) Int. Cl.

| | |
|---|---|
| *G06V 20/40* | (2022.01) |
| *G06V 10/40* | (2022.01) |
| *G06N 3/04* | (2023.01) |
| *G06N 3/088* | (2023.01) |
| *G06F 16/735* | (2019.01) |
| *G06F 18/24* | (2023.01) |
| *G06F 18/214* | (2023.01) |

(52) U.S. Cl.
CPC .......... *G06V 20/41* (2022.01); *G06F 16/735* (2019.01); *G06F 18/214* (2023.01); *G06F 18/24* (2023.01); *G06N 3/04* (2013.01); *G06N 3/088* (2013.01); *G06V 10/40* (2022.01); *G06V 20/46* (2022.01)

(58) Field of Classification Search
CPC ........ G06V 20/41; G06V 20/46; G06V 10/40; G06F 16/735; G06F 18/24; G06F 18/214; G06N 3/04; G06N 3/088
See application file for complete search history.

(56) References Cited

U.S. PATENT DOCUMENTS

| | | | |
|---|---|---|---|
| 9,443,320 B1 | 9/2016 | Gaidon et al. | |
| 2015/0248586 A1 | 9/2015 | Gaidon et al. | |
| 2022/0138473 A1* | 5/2022 | Kwatra | ................. G06N 3/088 382/190 |
| 2022/0230331 A1* | 7/2022 | Ramola | ................. G06T 7/246 |

OTHER PUBLICATIONS

Cho, Hyeon, et al. "Self-supervised spatio-temporal representation learning using variable playback speed prediction." arXiv preprint arXiv:2003.02692 2 (2020): 13-14. (Year: 2020).*

(Continued)

*Primary Examiner* — Utpal D Shah
(74) *Attorney, Agent, or Firm* — Daniel Morris; Otterstedt & Kammer PLLC

(57) ABSTRACT

Unsupervised learning for video classification. One or more features from one or more video clips are extracted using a spatial-temporal encoder. The one or more extracted features are processed, using a video instance discrimination task, to generate a classification label, the classification label indicating whether two of the video clips are from a same video. The one or more extracted features are processed, using a pair-wise speed discrimination task, to generate a comparison label, the comparison label indicating a relative playback speed between two given video clips. A search is performed in a video database for a video that is similar to a given video based on the comparison label.

20 Claims, 5 Drawing Sheets

(56) References Cited

OTHER PUBLICATIONS

W. Wu et al., "MVFNet: Multi-View Fusion Network for Efficient Video Recognition," Submitted on Dec. 13, 2020 (v1), last revised Jan. 5, 2021 (this version, v2)], https://arxiv.org/abs/2012.06977.

T. Han et al., "Self-supervised Co-training for Video Representation Learning," [Submitted on Oct. 19, 2020 (v1), last revised Jan. 11, 2021 (this version, v2)], https://arxiv.org/abs/2010.09709.

Y. Yao et al., "Video Playback Rate Perception for Self-Supervised Spatio-Temporal Representation Learning," 2020 IEEE/CVF Conf. on Computer Vision and Pattern Recognition (CVPR), 2020, pp. 6547-6556.

J. Wang et al., "Self-supervised Video Representation Learning by Pace Prediction," Submitted on Aug. 13, 2020 (v1), last revised Sep. 4, 2020 (this version, v2)], https://arxiv.org/abs/2008.05861.

S. Benaim et al., "SpeedNet: Learning the Speediness in Videos," 2020 IEEE/CVF Conference on Computer Vision and Pattern Recognition (CVPR), Seattle, WA, USA, 2020, pp. 9919-9928.

J. Wang et al., "Self-Supervised Spatio-Temporal Representation Learning for Videos by Predicting Motion and Appearance Statistics," 2019 IEEE/CVF Conference on Computer Vision and Pattern Recognition (CVPR), Long Beach, CA, USA, 2019, pp. 4001-4010.

Peter Mell and Timothy Grance, The NIST Definition of Cloud Computing, NIST Special Publication 800-145, Sep. 2011, cover, pp. i-iii and 1-3.

P. Chen et al., "RSPNet: Relative Speed Perception for Unsupervised Video Representation Learning," [Submitted on Oct. 27, 2020], https://arxiv.org/abs/2011.07949.

Counterpart PCT Application PCT/EP2022/056402, Auth. Officer Karin Exner, EPO as ISA, Int'l. Search Report and Written Opinion 11 pages total Jun. 14, 2022.

* cited by examiner

UNSUPERVISED VIDEO REPRESENTATION LEARNING

BACKGROUND

The present invention relates to the electrical, electronic and computer arts, and more specifically, to video processing systems.

Video is conventionally analyzed to categorize the video for information retrieval and other tasks. For example, spatio-temporal features of videos, such as motion features, appearance features, and the like, may be extracted from a video and used by downstream video understanding tasks, such as action recognition. Extracting video features is important because videos often contain complex spatial-temporal contents and have a larger data volume compared with static images, making it very challenging to annotate and analyze the videos. Most existing methods achieve this goal based, for example, on a playback speed perception task, which utilizes models to predict the playback speed of video clips. The playback speed labels that are generated by the playback speed perception task can be imprecise because the task often performs inaccurately and inconsistently due to the motion content of the videos. Moreover, existing methods do not encourage the use of models that also explore appearance features, which are also important in the area of video analysis.

SUMMARY

Principles of the invention provide techniques for unsupervised video representation learning. In one aspect, an exemplary method includes the operations of extracting, using a spatial-temporal encoder, one or more features from one or more video clips; processing, using a video instance discrimination task, the one or more extracted features to generate a classification label, the classification label indicating whether two of the video clips are from a same video; processing, using a pair-wise speed discrimination task, the one or more extracted features to generate a comparison label, the comparison label indicating a relative playback speed between two given video clips; and searching, in a video database, for a video that is similar to a given video based on the comparison label.

In one aspect, an apparatus comprises a memory and at least one processor, coupled to said memory, and operative to perform operations of extracting, using a spatial-temporal encoder, one or more features from one or more video clips; processing, using a video instance discrimination task, the one or more extracted features to generate a classification label, the classification label indicating whether two of the video clips are from a same video; processing, using a pair-wise speed discrimination task, the one or more extracted features to generate a comparison label, the comparison label indicating a relative playback speed between two given video clips; and searching, in a video database, for a video that is similar to a given video based on the comparison label.

In one aspect, computer program product includes a computer readable storage medium having program instructions embodied therewith, the program instructions executable by a computer to cause the computer to perform a method of extracting, using a spatial-temporal encoder, one or more features from one or more video clips; processing, using a video instance discrimination task, the one or more extracted features to generate a classification label, the classification label indicating whether two of the video clips are from a same video; processing, using a pair-wise speed discrimination task, the one or more extracted features to generate a comparison label, the comparison label indicating a relative playback speed between two given video clips; and searching, in a video database, for a video that is similar to a given video based on the comparison label.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated stored thereon in a non-transitory manner. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

extraction of motion and appearance features of videos;
    neural networks for a video instance discrimination task designed to determine if two video clips are from the same video;
    increased accuracy compared to conventional video analysis techniques;
    improved technological processes, such as retrieving videos from databases, computer vision, and the like; and
    neural networks for a pair-wise speed discrimination task designed to learn temporal features and identify differences in playback speed between video clips.

These and other features and advantages of the present invention will become apparent from the following detailed description of illustrative embodiments thereof, which is to be read in connection with the accompanying drawings.

DETAILED DESCRIPTION

Figure 1:
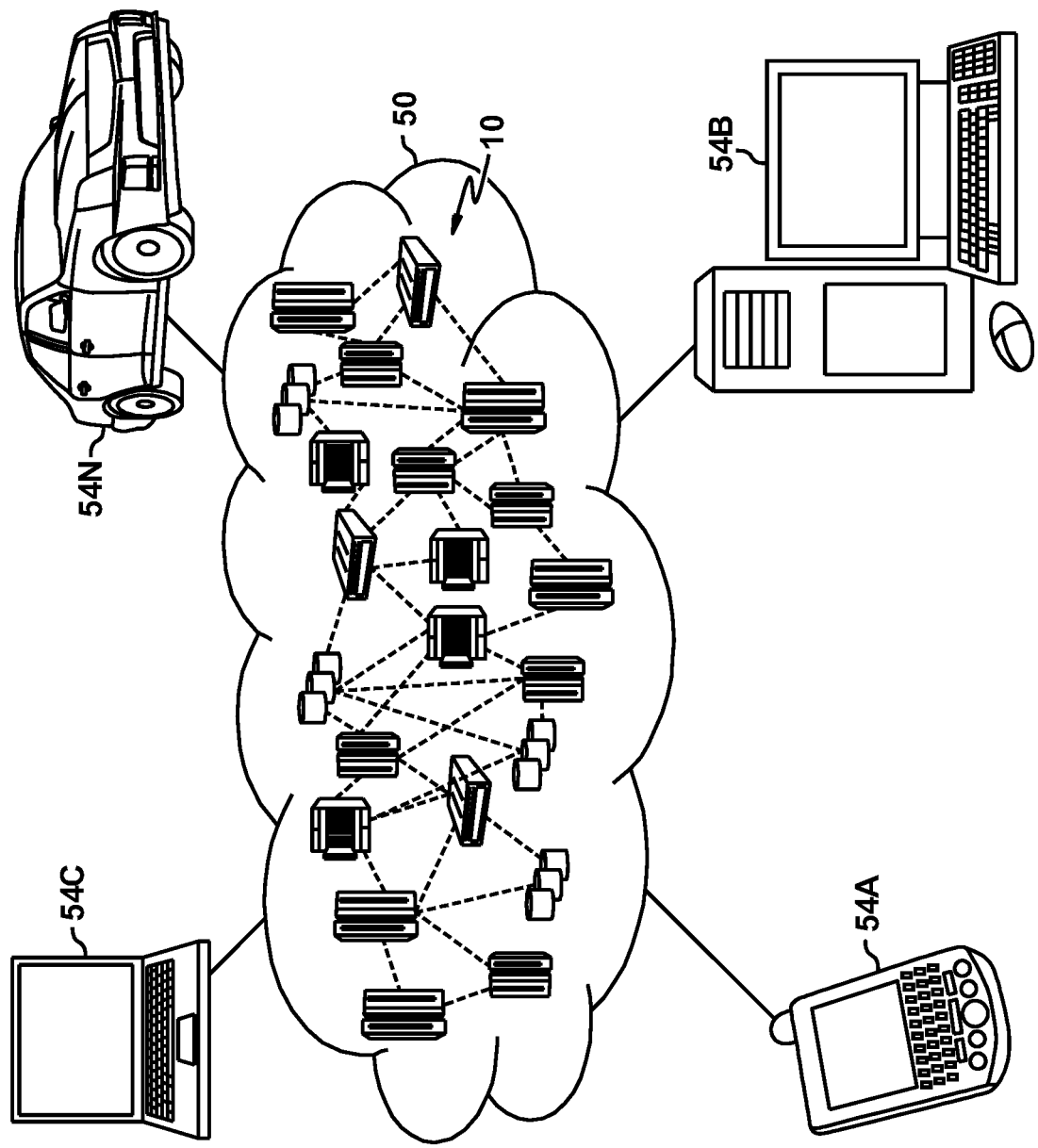
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
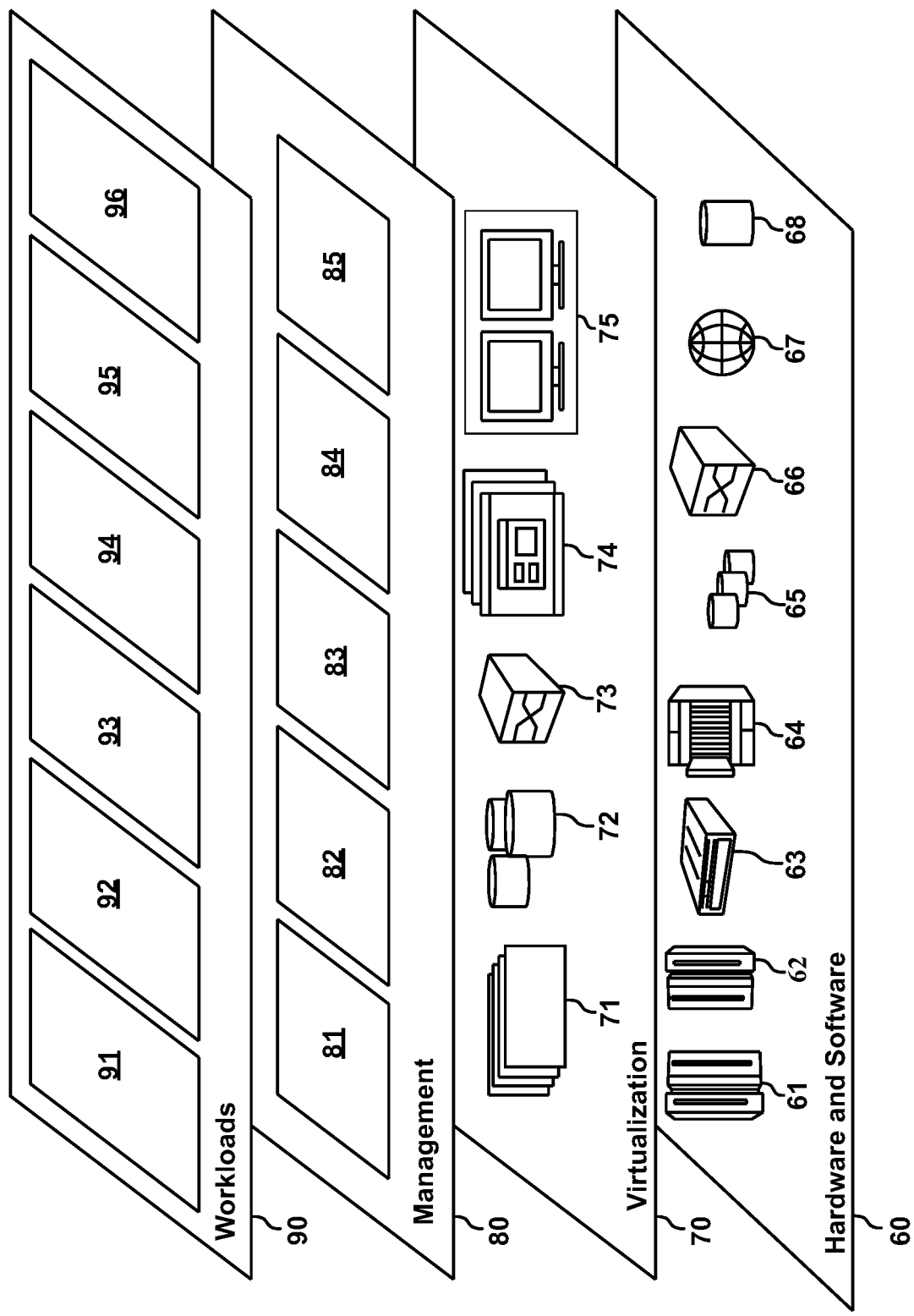
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a video processing component 96 that implements aspects of unsupervised video representation learning.

Figure 3:
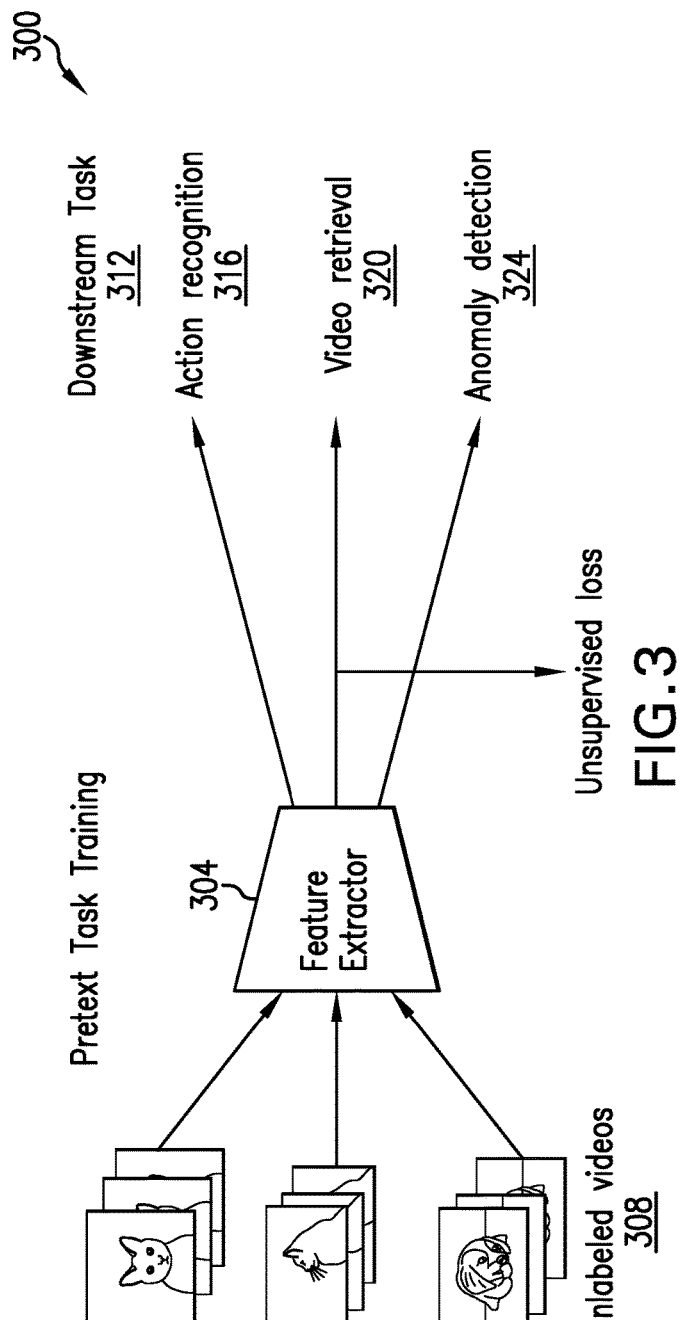
FIG. 3 is a block diagram for a pretext task training workflow, in accordance with an example embodiment.

Generally, systems and methods for analyzing videos are disclosed. In one example embodiment, a video representation is learned in an unsupervised manner. In one example embodiment, both motion and appearance features of a video, which are important for downstream video understanding tasks, such as action recognition, are learned from unlabeled videos. As noted above, extracting video features is important because videos often contain complex spatial-temporal contents and have a larger data volume compared with static images, making it very challenging to annotate and analyze the videos. FIG. 3 is a block diagram for a pretext task training workflow 300, in accordance with an example embodiment. In this regard, computer vision pipelines that employ self-supervised learning involve performing two tasks, a pretext task and a real (downstream) task. The real (downstream) task can be a variety of tasks, such as a classification or detection task, with insufficient annotated data samples. The pretext task is the self-supervised learning task that is solved to learn visual representations, with the aim of using the learned representations or model weights obtained in the process, for the downstream task. The process is characterized by an unsupervised loss, such as a cross-entropy loss, that is minimized during training.

In one example embodiment, a feature extractor 304 is trained using unlabeled videos 308 (videos and video clips are used interchangeably herein) to extract features for downstream tasks 312, such as an action recognition task 316, a video retrieval task 320, and an anomaly detection task 324. Each video 308 is a digitized video based on, for example, MPEG (motion picture experts group)-4 and the like (e.g., another video coding format). Different videos 308 have different base speeds (the speed of movement of objects in a 1× video, where 1× refers to the playback speed). It is often difficult to determine and annotate a speed label for a specific video clip. Unsupervised video representation learning aims to learn the appearance and motion features of the unlabeled videos 308 that are useful for facilitating downstream tasks 312.

Figure 4:
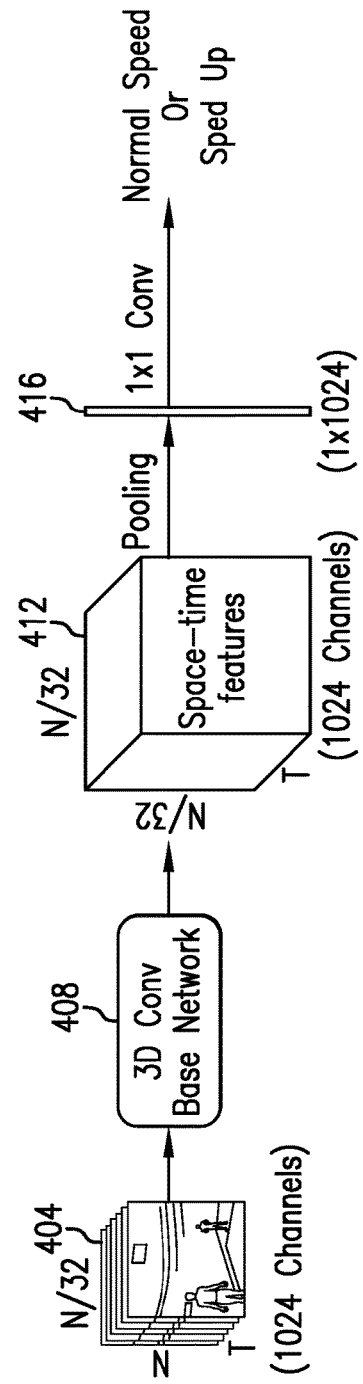
FIG. 4 is a block diagram of an example prior-art video analysis system.

FIG. 4 is a block diagram of an example conventional video analysis system 400. A plurality of channels representing video frames 404 are input to a three-dimensional (3D) convolutional neural network 408 to produce space-time features 412. In the example embodiment of FIG. 4, the space-time features 412 are represented by 1024 channels, although representations comprising other quantities of channels can be employed. The space-time features 412 are then pooled prior to processing by a 1×1 convolutional filter 416 to determine whether the video 308 is, for example, a normal speed video or a sped-up video. In general, pooling is used to generate a global representation of an image. For example, the space-time features may be pooled over a neighborhood, or section, of the video frame 404. Given a video clip 308, the model is utilized to predict, for example, the relative playback speed of the video clip 308. Conventional systems, however, typically neglect to learn spatial information of the video clip 308 (which is also important to the downstream tasks 312); conventional systems mainly utilize the models to learn temporal information.

Figure 5:
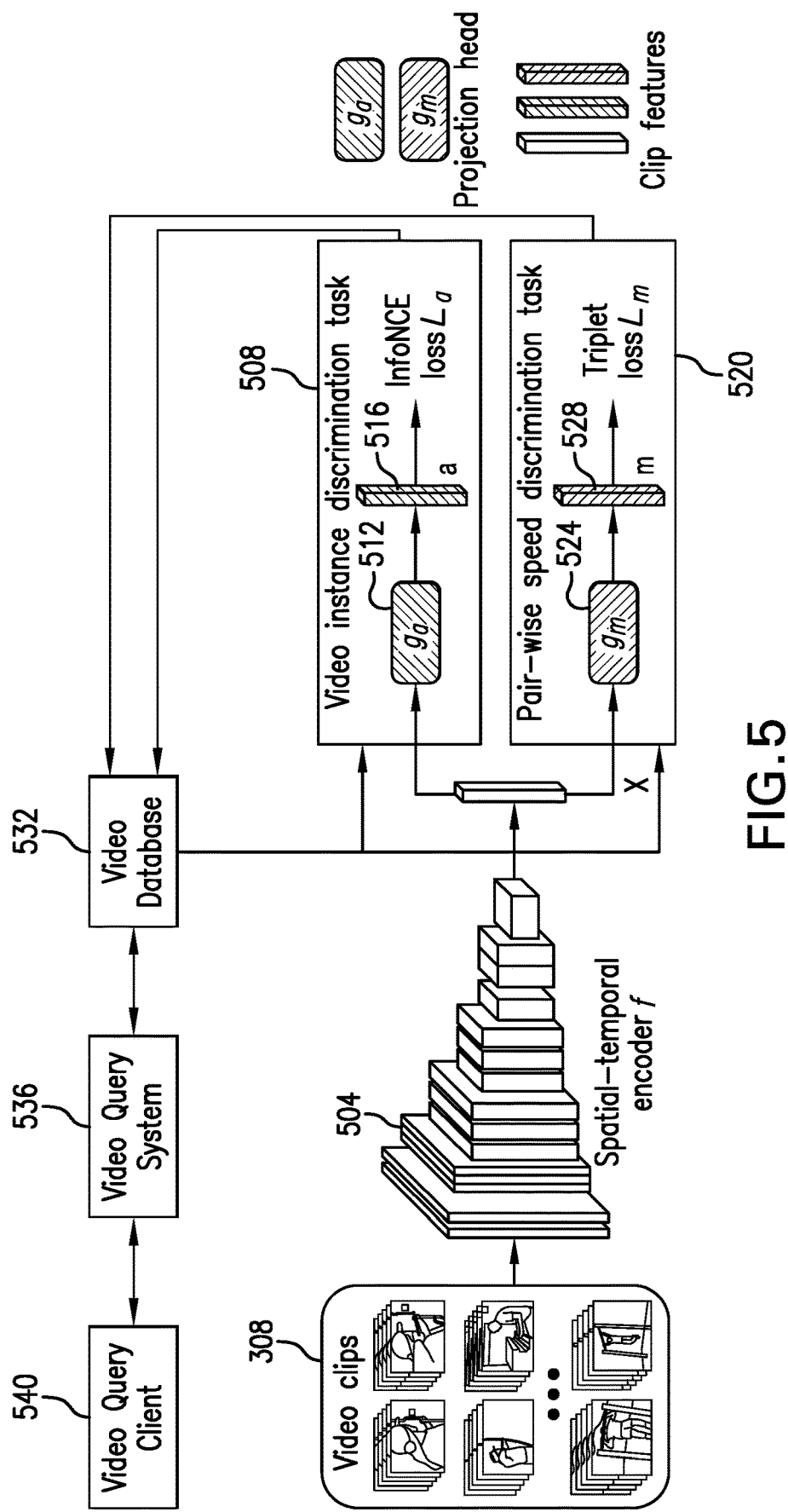
FIG. 5 is a block diagram of an example video analysis system, in accordance with an example embodiment.

FIG. 5 is a block diagram of an example video analysis system 500, in accordance with an example embodiment. In one example embodiment, instead of predicting a speed of a specific video clip 308, the video frames 404 of two video clips 308 are sampled and a neural network is trained to identify the relative playback speed of the sampled video clips 308 in relation to the playback speed of another video clip 308. A pretext task exploits the determined relative playback speeds and generates labels for understanding the speed of the video clip 308. Moreover, to encourage models to pay attention to appearance features, a model is trained to be able to identify two clips that are sampled from the same video 308 from among a large number of video clips 308, including many video clips 308 from other videos 308. In this sense, the models learn both motion and appearance features simultaneously and avoid the speed label ambiguity problem with existing methods.

In one example embodiment, the features of each video clip 308 are extracted by a spatial-temporal encoder 504 using a deep neural network that performs unsupervised learning and generates a feature vector x. The extracted features are processed by a video instance discrimination task 508 and a pair-wise speed discrimination task 520.

In one example embodiment, the video instance discrimination task 508 is designed to determine if two video clips 308 are components of the same video using a model $g_a$ 512 and label the video clips 308 accordingly. For example, the video instance discrimination task 508 labels each video clip 308 with the identifier for the video 308 of which the video clip 308 is a component. The output of the video instance discrimination task 508 is a classification label 516 indicating the classification of the corresponding video clip 308 and a loss $\mathcal{L}_a$. The classification labels 516 are stored in the video database 532 as metadata for the corresponding video clip(s) 308. In one example embodiment, the video instance discrimination task 508 is a neural network that minimizes the loss $\mathcal{L}_a$.

During training, the model $g_a$ 512 of the neural network is created by training the video instance discrimination task 508 using a database 532 of training videos 308 and corresponding training video clips 308. The video instance discrimination task 508 learns to distinguish video clips 308 derived from the same video 308 from video clips 308 derived from different videos 308. In one example embodiment, the video instance discrimination task 508 is trained by inputting, to the video instance discrimination task 508, video clips 308 known to be derived from the same video 308 and then using contrastive learning to distinguish the video clips 308. The skilled artisan will recognize that contrastive learning considers which pairs of data points are similar and which pairs of data points are dissimilar to learn high-level features of data prior to, for example, performing classification. This is known as self-supervised learning and is effective with unlabeled data sets.

In one example embodiment, the loss $\mathcal{L}_a$ is based on cross-entropy. The skilled artisan will recognize that cross-entropy is often used to define a loss function in machine learning. In general, cross-entropy can be used to derive a measure of dissimilarity between an actual distribution of data and an imperfect distribution of data, such as the classification of the video clips 308.

In one example embodiment, the pair-wise speed discrimination task 520 is designed to learn temporal features using models trained to compare playback speeds of video clips 308. For example, a model $g_m$ 524 of the pair-wise speed discrimination task 520 can be used to compare the playback speeds of two video clips 308. The output of the pair-wise speed discrimination task 520 is a comparison label 528 indicating the classification of the corresponding video clips 308 and a loss $\mathcal{L}_m$. In one example embodiment, the pair-wise discrimination task 520 is a neural network that minimizes the loss $\mathcal{L}_m$. In one example embodiment, given two video clips 308, the pair-wise speed discrimination task 520 labels each of the two video clips 308 as either having the same playback speed or having different playback speeds. The comparison labels 528 are stored in the video database 532 as metadata for the corresponding video clip(s) 308.

In one example embodiment, the pair-wise speed discrimination task 520 is trained using contrastive learning. As noted above, the skilled artisan will recognize that contrastive learning considers which pairs of data points are similar and which pairs of data points are dissimilar, to learn high-level features of data prior to, for example, perform classification. This is known as self-supervised learning and is effective with unlabeled data sets. In one example embodiment, gradient descent is utilized as the (first-order iterative) optimization algorithm for finding the local minimum of the differentiable function where steps are repeatedly taken in the direction of steepest descent. During training, the playback speed of different video clips 308 is manually adjusted and submitted to the pair-wise speed discrimination task 520 which learns to recognize when two video clips 308 have the same playback speed and when the two video clips have different playback speeds. In one example embodiment, the loss $\mathcal{L}_m$ is based on cross-entropy. As noted above, the skilled artisan will recognize that cross-entropy is often used to define a loss function in machine learning. In general, cross-entropy can be used to derive a measure of dissimilarity between an actual distribution of data and an imperfect distribution of data, such as the speed classification of the video clips 308.

In one example embodiment, following classification, a query is submitted via a video query client 540 to a video query system 536 to search, identify and access the video clips 308 in the video database 532 based on the labels 516, 528 generated by the video instance discrimination task 508 and the pair-wise speed discrimination task 520, respectively. For example, a search may be performed to identify a video clip 308 that is similar to a given video clip 308 in terms of playback speed based on the comparison labels 528 generated by the pair-wise speed discrimination task 520. Similarly, a search may be performed to identify a video clip 308 that is from the same video 308 as a given video clip 308 based on the classification labels 516 generated by the video instance discrimination task 508. In one example embodiment, a search may be performed to identify a video clip 308 that is both from the same video 308 as a given video clip 308 based on the classification labels 516 generated by the video instance discrimination task 508 and that is similar to the given video clip 308 in terms of playback speed based on the comparison labels 528 generated by the pair-wise speed discrimination task 520.

Given the discussion thus far, it will be appreciated that, in general terms, an exemplary method, according to an aspect of the invention, includes the steps of extracting, using a spatial-temporal encoder 504, one or more features from one or more video clips 308; processing, using a video instance discrimination task 508, the one or more extracted features to generate a classification label 516, the classification label 516 indicating whether two of the video clips 318 are from a same video; processing, using a pair-wise speed discrimination task 520, the one or more extracted features to generate a comparison label 528, the comparison label 528 indicating a relative playback speed between two given video clips 308; and searching, in a video database, for a video that is similar to a given video based on the comparison label 528.

In one aspect, an apparatus comprises a memory and at least one processor, coupled to said memory, and operative to perform operations of extracting, using a spatial-temporal encoder 504, one or more features from one or more video clips 308; processing, using a video instance discrimination task 508, the one or more extracted features to generate a classification label 516, the classification label 516 indicating whether two of the video clips 318 are from a same video; processing, using a pair-wise speed discrimination task 520, the one or more extracted features to generate a comparison label 528, the comparison label 528 indicating a relative playback speed between two given video clips 308; and searching, in a video database, for a video that is similar to a given video based on the comparison label 528.

In one aspect, a computer program product includes a computer readable storage medium having program instructions embodied therewith, the program instructions executable by a computer to cause the computer to perform a method of extracting, using a spatial-temporal encoder 504, one or more features from one or more video clips 308; processing, using a video instance discrimination task 508, the one or more extracted features to generate a classification label 516, the classification label 516 indicating whether two of the video clips 318 are from a same video; processing, using a pair-wise speed discrimination task 520, the one or more extracted features to generate a comparison label 528, the comparison label 528 indicating a relative playback speed between two given video clips 308; and searching, in a video database, for a video that is similar to a given video based on the comparison label 528.

In one example embodiment, the spatial-temporal encoder 504 is based on a spatial-temporal neural network. In one example embodiment, the video instance discrimination task 508 is based on a model $g_a$ 512 of a video instance neural network. In one example embodiment, the model $g_a$ 512 is trained using a database 532 of training videos 308 and corresponding training video clips 308 to distinguish video clips 308 derived from the same video 308 from video clips 308 derived from different videos 308. In one example embodiment, the processing, using the video instance discrimination task 508, the one or more extracted features further generates a loss $\mathcal{L}_a$.

In one example embodiment, the pair-wise speed discrimination task 520 is based on a model $g_b$ 524 of a pair-wise speed discrimination neural network. In one example embodiment, the model $g_b$ 524 is trained using a database 532 of training videos 308 and corresponding training video clips 308 to identify a difference in playback speed between two video clips 308. In one example embodiment, the processing, using the pair-wise speed discrimination task 520, the one or more extracted features further generates a loss $\mathcal{L}_m$. In one example embodiment, the searching operation is further based on the classification label 516.

Figure 6:
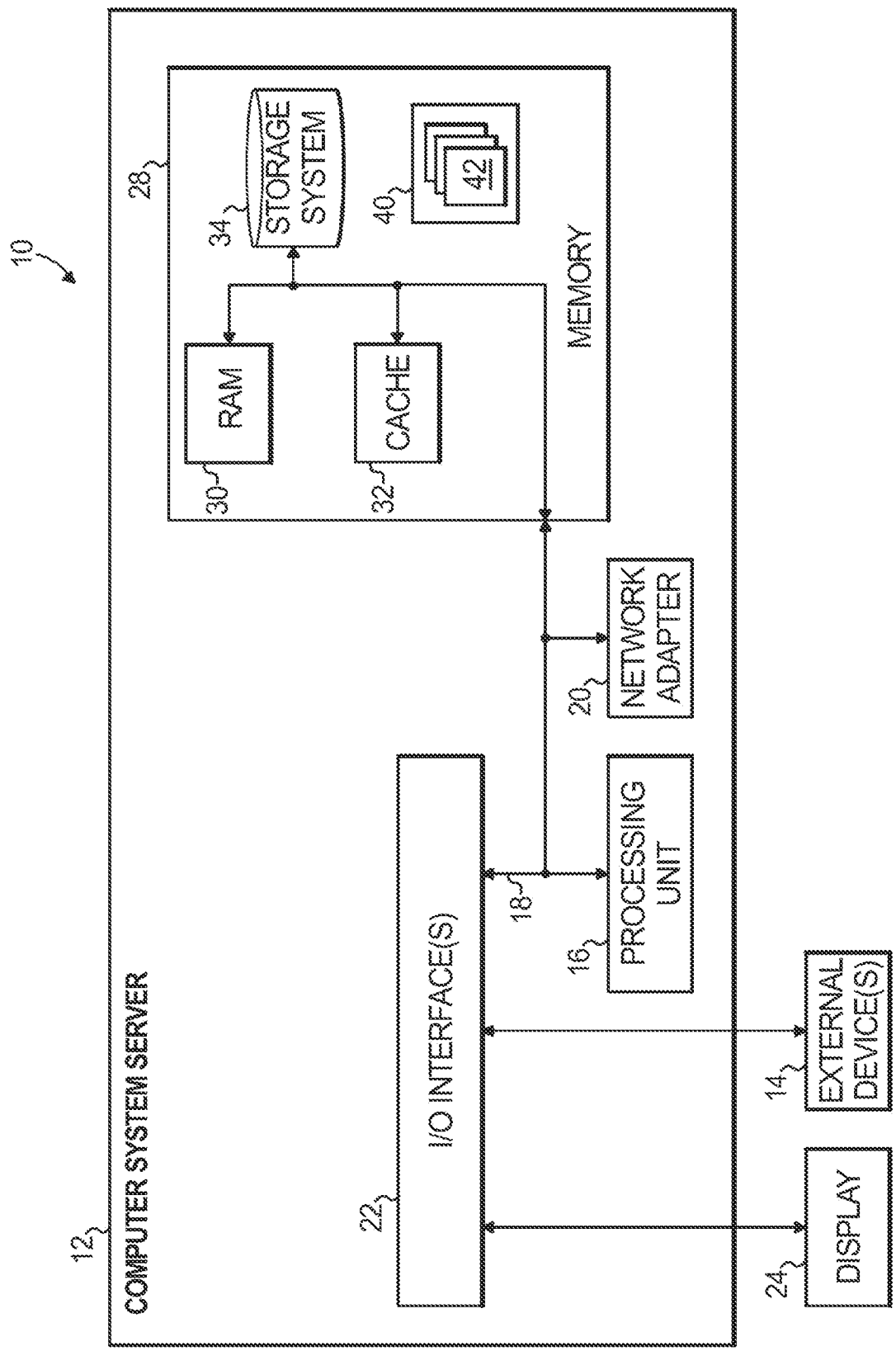
FIG. 6 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 6 depicts a computer system that may be useful in implementing one or more aspects and/or elements of the invention, also representative of a cloud computing node according to an embodiment of the present invention. Referring now to FIG. 6, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 6, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 6) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules. One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   extracting, using a spatial-temporal encoder, one or more features from one or more video clips;
   processing, using a video instance discrimination task, the one or more extracted features to generate a classification label, the classification label indicating whether two of the video clips are from a same video;
   processing, using a pair-wise speed discrimination task, the one or more extracted features to generate a comparison label, the comparison label indicating a relative playback speed between two given video clips; and
   searching, in a video database, for a video that is similar to a given video clip in terms of playback speed based on the comparison label generated by the pair-wise speed discrimination task and that is from a same video as the given video clip based on the classification label generated by the video instance discrimination task.

2. The method of claim 1, wherein the spatial-temporal encoder is based on a spatial-temporal neural network.

3. The method of claim 1, wherein the video instance discrimination task is based on a model $g_a$ of a video instance neural network.

4. The method of claim 3, the method further comprising training the model $g_a$ using a database of training videos and corresponding training video clips to distinguish video clips derived from the same video from video clips derived from different videos.

5. The method of claim 1, wherein the processing, using the video instance discrimination task, the one or more extracted features further generates a loss $\mathcal{L}_a$.

6. The method of claim 1, wherein the pair-wise speed discrimination task is based on a model $g_b$ of a pair-wise speed discrimination neural network.

7. The method of claim 6, the method further comprising training the model $g_b$ using a database of training videos and corresponding training video clips to identify a difference in playback speed between two video clips.

8. The method of claim 1, wherein the processing, using the pair-wise speed discrimination task, the one or more extracted features further generates a loss $\mathcal{L}_m$.

9. The method of claim 1, wherein the searching operation is further based on the classification label.

10. An apparatus comprising:
a memory; and
at least one processor, coupled to said memory, and operative to perform operations of:
extracting, using a spatial-temporal encoder, one or more features from one or more video clips;
processing, using a video instance discrimination task, the one or more extracted features to generate a classification label, the classification label indicating whether two of the video clips are from a same video;
processing, using a pair-wise speed discrimination task, the one or more extracted features to generate a comparison label, the comparison label indicating a relative playback speed between two given video clips; and
searching, in a video database, for a video that is similar to a given video clip in terms of playback speed based on the comparison label generated by the pair-wise speed discrimination task and that is from a same video as the given video clip based on the classification label generated by the video instance discrimination task.

11. The apparatus of claim 10, wherein the spatial-temporal encoder is based on a spatial-temporal neural network.

12. The apparatus of claim 10, wherein the video instance discrimination task is based on a model $g_a$ of a video instance neural network.

13. The apparatus of claim 12, the operations further comprising training the model $g_a$ using a database of training videos and corresponding training video clips to distinguish video clips derived from the same video from video clips derived from different videos.

14. The apparatus of claim 10, wherein the processing, using the video instance discrimination task, the one or more extracted features further generates a loss $\mathcal{L}_a$.

15. The apparatus of claim 10, wherein the pair-wise speed discrimination task is based on a model $g_b$ of a pair-wise speed discrimination neural network.

16. The apparatus of claim 15, the operations further comprising training the model $g_b$ using a database of training videos and corresponding training video clips to identify a difference in playback speed between two video clips.

17. The apparatus of claim 10, wherein the processing, using the pair-wise speed discrimination task, the one or more extracted features further generates a loss $\mathcal{L}_m$.

18. The apparatus of claim 10, wherein the searching operation is further based on the classification label.

19. A computer program product comprising a computer readable storage medium having program instructions embodied therewith, the program instructions executable by a computer to cause the computer to perform a method of:
extracting, using a spatial-temporal encoder, one or more features from one or more video clips;
processing, using a video instance discrimination task, the one or more extracted features to generate a classification label, the classification label indicating whether two of the video clips are from a same video;
processing, using a pair-wise speed discrimination task, the one or more extracted features to generate a comparison label, the comparison label indicating a relative playback speed between two given video clips; and
searching, in a video database, for a video that is similar to a given video clip in terms of playback speed based on the comparison label generated by the pair-wise speed discrimination task and that is from a same video as the given video clip based on the classification label generated by the video instance discrimination task.

20. The computer program product of claim 19, wherein the searching operation is further based on the classification label.

* * * * *